(12) United States Patent
Colibert et al.

(10) Patent No.: US 7,988,176 B2
(45) Date of Patent: Aug. 2, 2011

(54) FIFTH-WHEEL HITCH ASSEMBLY ADAPTABLE FOR USE WITH MULTIPLE VEHICLE HITCH COUPLING SYSTEMS

(75) Inventors: Gregory J. Colibert, Salt Lake City, UT (US); Jackie Colibert-Clarke, Salt Lake City, UT (US)

(73) Assignee: Camco Manufacturing, Inc., Greensboro, NC (US)

( * ) Notice: Subject to any disclaimer, the term of this patent is extended or adjusted under 35 U.S.C. 154(b) by 245 days.

(21) Appl. No.: 12/075,785

(22) Filed: Mar. 12, 2008

(65) Prior Publication Data
US 2008/0224442 A1      Sep. 18, 2008

Related U.S. Application Data

(60) Provisional application No. 60/906,654, filed on Mar. 12, 2007.

(51) Int. Cl.
*B60F 3/10* (2006.01)

(52) U.S. Cl. .................. 280/416.1; 280/491.5; 280/433; 280/901

(58) Field of Classification Search ............... 280/416.1, 280/416.3, 417.1, 901, 491.5, 433, 441.2
See application file for complete search history.

(56) References Cited

U.S. PATENT DOCUMENTS

| | | | |
|---|---|---|---|
| 2,475,878 A | 7/1949 | Clark et al. | |
| 3,164,399 A | 1/1965 | Lugash | |
| 3,390,896 A | 7/1968 | Philapy | |
| 3,527,476 A | 9/1970 | Winckler | |
| 3,733,089 A | 5/1973 | Goecke et al. | |
| 3,788,673 A | 1/1974 | Gloege | |
| 3,889,978 A | 6/1975 | Kann | |
| 4,183,548 A | 1/1980 | Schneckloth | |
| 4,266,797 A | 5/1981 | Rhodes | |
| 4,832,358 A | 5/1989 | Bull | |
| 5,016,898 A | 5/1991 | Works et al. | |
| 5,058,915 A | 10/1991 | Burns | |
| 5,344,172 A * | 9/1994 | Jaun | 280/415.1 |
| 5,513,869 A * | 5/1996 | Putnam | 280/415.1 |
| 5,788,257 A * | 8/1998 | Meyerhofer | 280/416.1 |
| 6,135,482 A * | 10/2000 | Larkin | 280/416.1 |
| 6,170,850 B1 | 1/2001 | Works | |
| 6,612,380 B2 * | 9/2003 | Pyle | 172/439 |
| 6,659,490 B1 * | 12/2003 | Simpson | 280/416.1 |
| 6,695,338 B1 * | 2/2004 | Roberts | 280/491.5 |
| 6,969,090 B1 | 11/2005 | Works | |
| 7,011,327 B2 | 3/2006 | Colibert et al. | |
| 7,152,870 B2 * | 12/2006 | Gurtler | 280/483 |
| 7,753,391 B1 * | 7/2010 | Hesse et al. | 280/439 |

OTHER PUBLICATIONS

Colibert, et al.; U.S. Appl. No. 12/075,803, filed Mar. 12, 2008.
Colibert, et al.; U.S. Appl. No. 12/075,784, filed Mar. 12, 2008.

* cited by examiner

*Primary Examiner* — Kevin Hurley

(57) ABSTRACT

An adaptive fifth-wheel hitch system operable with a vehicle hitch coupling system, the fifth-wheel hitch assembly comprising a fifth-wheel hitch assembly configured to removably couple a fifth-wheel trailer to a vehicle; an adapter configured to operably relate and to removably couple the fifth-wheel hitch assembly to the vehicle hitch coupling system, the fifth-wheel hitch assembly and the vehicle hitch coupling system otherwise being inoperable with one another, the adapter comprising a mounting component having a first interface operable to relate and secure the adapter to the fifth-wheel hitch assembly, and a coupling component having a second interface operable to relate and secure the adapter to the vehicle hitch coupling system, the coupling component corresponding to a receiving component of the vehicle hitch coupling system.

7 Claims, 8 Drawing Sheets

FIFTH-WHEEL HITCH ASSEMBLY ADAPTABLE FOR USE WITH MULTIPLE VEHICLE HITCH COUPLING SYSTEMS

RELATED APPLICATIONS

This application claims the benefit of U.S. Provisional Application Ser. No. 60/906,654, filed Mar. 12, 2007, and entitled, "Fifth-wheel Hitch Assembly Adaptable for Use with Multiple Vehicle Hitch Coupling Systems," which is incorporated by reference in its entirety herein.

FIELD OF THE INVENTION

The present invention relates generally to hitches and hitch assemblies for vehicles, and more particularly to a fifth-wheel hitch assembly.

BACKGROUND OF THE INVENTION AND RELATED ART

A fifth-wheel trailer is generally a large, high profile trailer which is coupled to a towing vehicle, such as a pick-up or other suitable vehicle. The fifth-wheel trailer is typically releasably coupled to the towing vehicle using a fifth-wheel hitch assembly or a simple ball-hitch, depending upon the type and size of the fifth-wheel trailer. With respect to prior related fifth-wheel hitch assemblies, many of these are configured to be permanently mounted within the bed of the truck, although more are being designed to be removable to permit full and unobstructed use of the bed of the truck when the fifth-wheel trailer is not being used.

Fifth-wheel hitch assemblies, particularly those that are removable from the towing vehicle, typically utilize a vehicle hitch coupling system that itself is or is substantially permanently mounted to the towing vehicle, such as the frame of the towing vehicle, and that is used to support specific types of hitching members, such as a specific type of fifth-wheel hitch assembly and/or ball hitch. One inherent difficulty with conventional vehicle hitch coupling systems is that they are typically intended for use with a single, specific type of fifth-wheel hitch assembly or ball hitch. For instance, conventional vehicle hitch coupling systems comprise a receiving component or portion that is designed and configured to only interface with a matching or corresponding coupling component or portion of a single, specific hitching member. Likewise, conventional hitching members, namely fifth-wheel hitch assemblies and ball hitches, are intended for use with a single, specific type of vehicle hitch coupling system. Such proprietary relationships between the hitching member and the vehicle hitch coupling system severely limits individual choice and/or selection, as well as the ability to easily transition from one system or hitching member to another. In addition, such proprietary relationships significantly increases costs in the event one desires to use a different hitching member with an existing vehicle hitch coupling system and/or towing vehicle, or vice versa, when one desires to use a different towing vehicle and/or vehicle hitch coupling system with an existing hitching member.

SUMMARY OF THE INVENTION

In light of the problems and deficiencies inherent in the prior art, the present invention seeks to overcome these by providing an adaptive fifth-wheel hitch system, or a fifth-wheel hitch assembly that is adaptable for use with multiple vehicle hitch coupling systems, or in other words, that is made compatible and operable with, via an adapter, a vehicle hitch coupling system that is otherwise incompatible and inoperable with the fifth-wheel hitch assembly. More specifically, the present invention features various adapters operable to enable a single fifth-wheel hitch assembly to be used with multiple vehicle hitch coupling systems, depending upon the particular adapter employed, wherein the adapters are operable with the fifth-wheel hitch assembly and comprise a first interface operable with the fifth-wheel hitch assembly, and a second interface that corresponds to an existing coupling configuration on the vehicle hitch coupling system. The adapters are designed and used to operably relate a fifth-wheel hitch assembly of one type to an existing vehicle hitch coupling system otherwise designed to operate with a fifth-wheel hitch assembly of another type. Essentially, without the adapter, a fifth-wheel hitch assembly of the type that is not originally intended for use with the vehicle hitch coupling system would remain incompatible and inoperable with the vehicle hitch coupling system. Stated differently, the adapters are designed and used to operably relate a vehicle hitch coupling system of one type to an existing fifth-wheel hitch assembly designed and intended to operate with a vehicle hitch coupling system of another type. Again, without the adapter, the vehicle hitch coupling system of the originally non-compliant type would be incompatible and inoperable with the fifth-wheel hitch assembly. In essence, the adapters are intended to operably relate a fifth-wheel hitch assembly of one type to a vehicle hitch coupling system of another type, these being otherwise incompatible and inoperable with one another.

In accordance with the invention as embodied and broadly described herein, the present invention resides in an adaptive fifth-wheel hitch system operable with a vehicle hitch coupling system, the fifth-wheel hitch assembly comprising a fifth-wheel hitch assembly configured to removably couple a fifth-wheel trailer to a vehicle; an adapter configured to operably relate and to removably couple the fifth-wheel hitch assembly to the vehicle hitch coupling system, the fifth-wheel hitch assembly and the vehicle hitch coupling system otherwise being inoperable with one another, the adapter comprising a mounting component having a first interface operable to relate and secure the adapter to the fifth-wheel hitch assembly; and a coupling component having a second interface operable to relate and secure the adapter to the vehicle hitch coupling system, the coupling component corresponding to a receiving component of the vehicle hitch coupling system.

The present invention also resides in an adapter configured to operably relate a fifth-wheel hitch assembly to a vehicle hitch coupling system, the fifth-wheel hitch assembly and the vehicle hitch coupling system otherwise being incompatible and inoperable with one another, the adapter comprising a first interface operable to relate the adapter to the fifth-wheel hitch assembly; and a second interface operable to relate and removably couple the adapter to the vehicle hitch coupling system.

The present invention further resides in a method for operably relating a fifth-wheel hitch assembly to a vehicle hitch coupling system otherwise incompatible and inoperable with the fifth-wheel hitch assembly, the method comprising obtaining a fifth-wheel hitch assembly; obtaining a vehicle hitch coupling system being previously incompatible and inoperable with the fifth-wheel hitch assembly; obtaining an adapter having a first interface that operably relates the adapter to the fifth-wheel hitch assembly, and a second interface that operably relates the adapter to the vehicle hitch coupling system; relating the adapter to the fifth-wheel hitch assembly; and removably coupling the adapter to the vehicle hitch coupling system.

The present invention still further resides in a method for facilitating the use of a fifth-wheel hitch assembly with a vehicle hitch coupling system otherwise incompatible and inoperable with the fifth-wheel hitch assembly, the method comprising facilitating the interfacing of an adapter with the fifth-wheel hitch assembly; and facilitating the interfacing of the adapter with the vehicle hitch coupling system.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

Figure 1:
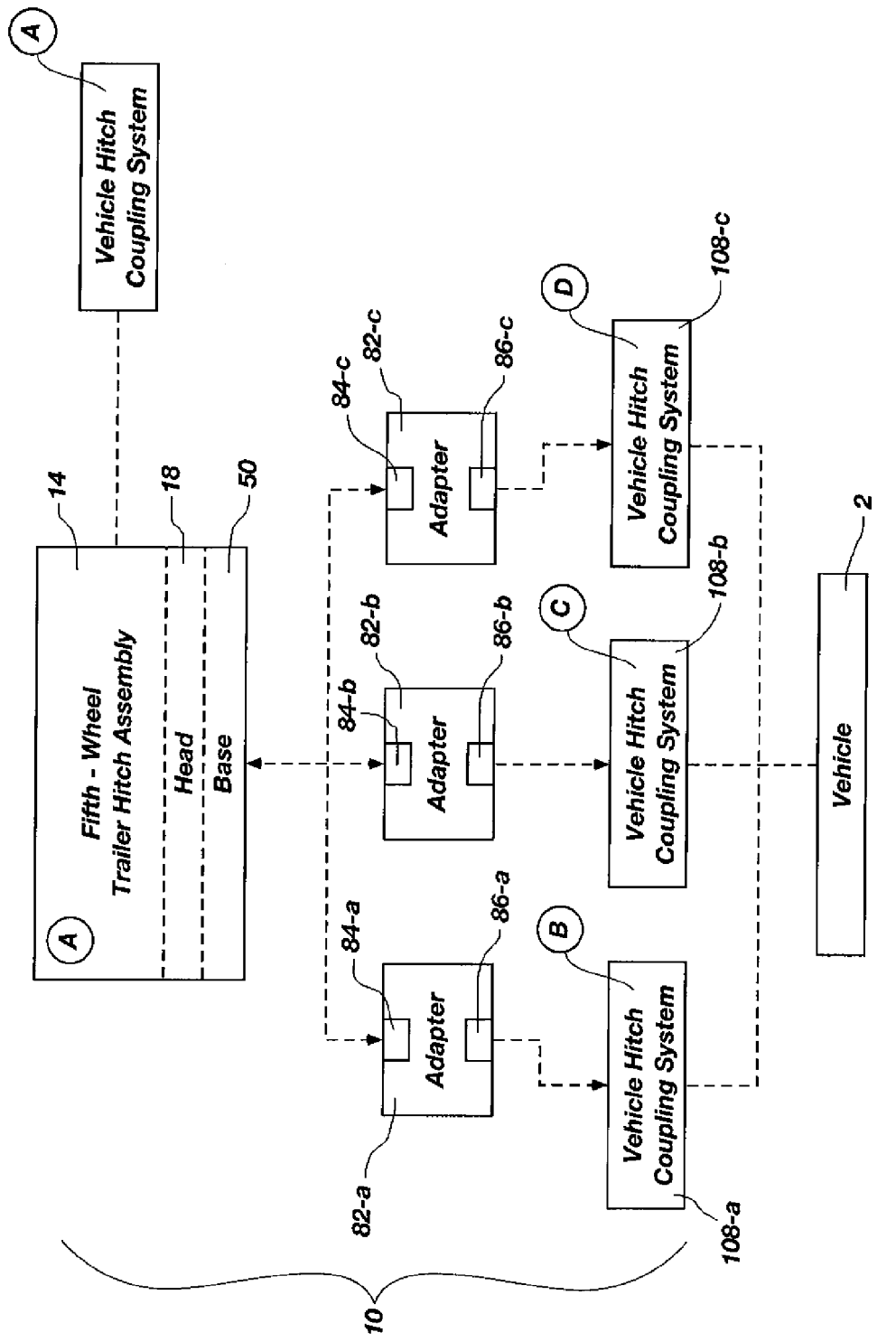
FIG. 1 illustrates a general block diagram of an adaptive fifth-wheel hitch system in accordance with the present invention, wherein the diagram depicts a fifth-wheel hitch assembly of type A that is made to be operable with one or more vehicle hitch coupling systems of another or different type through use of an adapter.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The term "vehicle hitch coupling system," as used herein, shall be understood to mean the system or configuration of components mounted to a vehicle for the purpose of supporting a hitching object or system within the vehicle (e.g., a hitch ball or ball hitch, a fifth-wheel hitch assembly, etc.) to enable the vehicle to pull a trailer, such as a fifth-wheel type trailer.

The term "receiving component," as used herein, shall be understood to mean the specific component or portion of the vehicle hitch coupling system designed and configured to removably receive and couple a corresponding component or portion of a hitching object or system being coupled to the vehicle hitch coupling system. For example, the receiving component may receive and couple the corresponding component of a hitch ball, a component operable with or part of the base of a fifth-wheel hitch assembly, the component of an adapter, etc.

The present invention describes a method and system for enabling a fifth-wheel hitch assembly of one type to operate and be compatible with a vehicle hitch coupling system generally configured to couple to and operate with a fifth-wheel hitch assembly of a different type.

The present invention provides several significant advantages over prior related fifth-wheel hitch assemblies, some of which advantages are recited here and throughout the following more detailed description. First, the present invention adaptive fifth-wheel hitch system permits a single fifth-wheel hitch assembly that is otherwise operable and compatible with only a certain type of vehicle hitch coupling system to be operable and compatible with multiple vehicle hitch coupling systems by utilizing an appropriate adapter. Second, users desiring to purchase a fifth-wheel hitch assembly are able to select a certain type of fifth-wheel its assembly independent of any vehicle hitch coupling system, thus providing a greater degree of choice and flexibility to consumers. Third, users having an existing vehicle hitch coupling system are able to choose from multiple different types of fifth-wheel hitch assemblies previously incompatible and in operable with their current vehicle hitch coupling system. The same may be said for those having existing fifth-wheel hitch assemblies who desire to use a different vehicle hitch coupling system.

Each of the above-recited advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

With reference to FIG. 1, illustrated is a general block diagram of an adaptive fifth-wheel hitch system in accordance with the present invention. As shown, the adaptive fifth-wheel hitch system 10 comprises a fifth-wheel hitch assembly 14 of type A that is generally thought to be usable only with a vehicle hitch coupling system also of type A (shown in dotted lines). The fifth-wheel hitch assembly 14 may comprise any type or design known in the art. As illustrated in FIG. 1, the fifth-wheel its assembly 14 may comprise a head component 18 and a base component 50, wherein the head component 18 may be removably coupled to the base component 50, and wherein the base component 50 is operable with a vehicle hitch coupling system of a vehicle 2, as is commonly known in the art.

The adaptive fifth-wheel hitch system 10 further comprises one or more adapters designed and configured to operably relate and secure or couple together otherwise inoperable and incompatible fifth-wheel hitch assemblies and vehicle hitch coupling systems. For example, as shown, the adapter 82-*a* is designed and configured to operably relate and secure the fifth-wheel hitch assembly 14 of type A to a vehicle hitch coupling system 108-*a* of type B operable with vehicle 2, wherein the vehicle hitch coupling system 108 of type B is generally thought to be usable only with a fifth-wheel hitch assembly also of type B (not shown). Similarly, the adapter 82-*b* is designed and configured to operably relate and secure the fifth-wheel hitch assembly 14 of type A to a vehicle hitch coupling system 108-*b* of type C, wherein the vehicle hitch coupling system 108-*b* of type C is generally thought to be usable only with a fifth-wheel hitch assembly also of type C (not shown); and the adapter 82-*c* is designed and configured to operably relate and secure the fifth-wheel hitch assembly 14 of type A to a vehicle hitch coupling system 108-*c* of type D, wherein the vehicle hitch coupling system 108-*c* of type D is generally thought to be usable only with a fifth-wheel hitch assembly also of type D (not shown). As can be seen, it is contemplated that a single fifth-wheel hitch assembly 14 of one type may be made to be compatible and operable with multiple different types of vehicle hitch coupling systems of different types (and vice versa) simply by utilizing an appropriate adapter.

The adapters 82 of the adaptive fifth-wheel hitch system 10 each comprise a first interface 84 designed and intended to operate or function with one or more components of the fifth-wheel hitch assembly 14. The first interface 84 may be embodied in a structural mounting component sized and configured to function and correspond to a structural arrangement on the fifth-wheel hitch assembly 14, or one or more of its components. Likewise, the adapters 82 each comprise a second interface 86 designed and intended to operate or function with one or more components of the vehicle hitch coupling system 108. The second interface 86 may be embodied in a structural coupling component sized and configured to function with and correspond to a structural receiving component on the vehicle hitch coupling system 108. In other words, the coupling component and the second interface 86 are intended to engage and mate with the receiving component of the desired vehicle hitch coupling system.

As the adapters 82-*a*, 82-*b*, and 82-*c* are each shown as being intended for use with the fifth-wheel hitch assembly 14, the first interfaces 84-*a*, 84-*b*, and 84-*c*, respectively, will be the same. However, as the adapters 82-*a*, 82-*b* and 82-*c* are each shown as being intended for use with different vehicle hitch mounting systems, shown as systems 108-*a*, 108-*b* and 108-*c*, respectively, each adapter will comprise a different interface, one that will enable it to be operable with a corresponding vehicle hitch coupling system. As can be seen, the present invention enables the fifth-wheel hitch assembly 14 to be adapted for use with multiple different types of vehicle hitch coupling systems.

The adapter 82 may be related and secured to the fifth-wheel hitch assembly 14, via the mounting component and the first interface 84, using any type of coupling or joining means. In one aspect, the adapter 82 may be permanently joined to the fifth-wheel hitch assembly 14, such as via one or more welds. In another aspect, the adapter 82 may be removably coupled to the fifth-wheel hitch assembly, such as via one or more fasteners or coupling means, such as bolts, internal threads, etc. One particular advantage of providing an adapter that is removably coupled to the fifth-wheel hitch assembly is that adapters may be interchanged with one another as needed. The coupling component and second interface 86 of the adapter is intended to removably couple the vehicle hitch coupling system in order to allow the fifth-wheel hitch assembly 14 to be removable from the vehicle 2.

Figure 2:
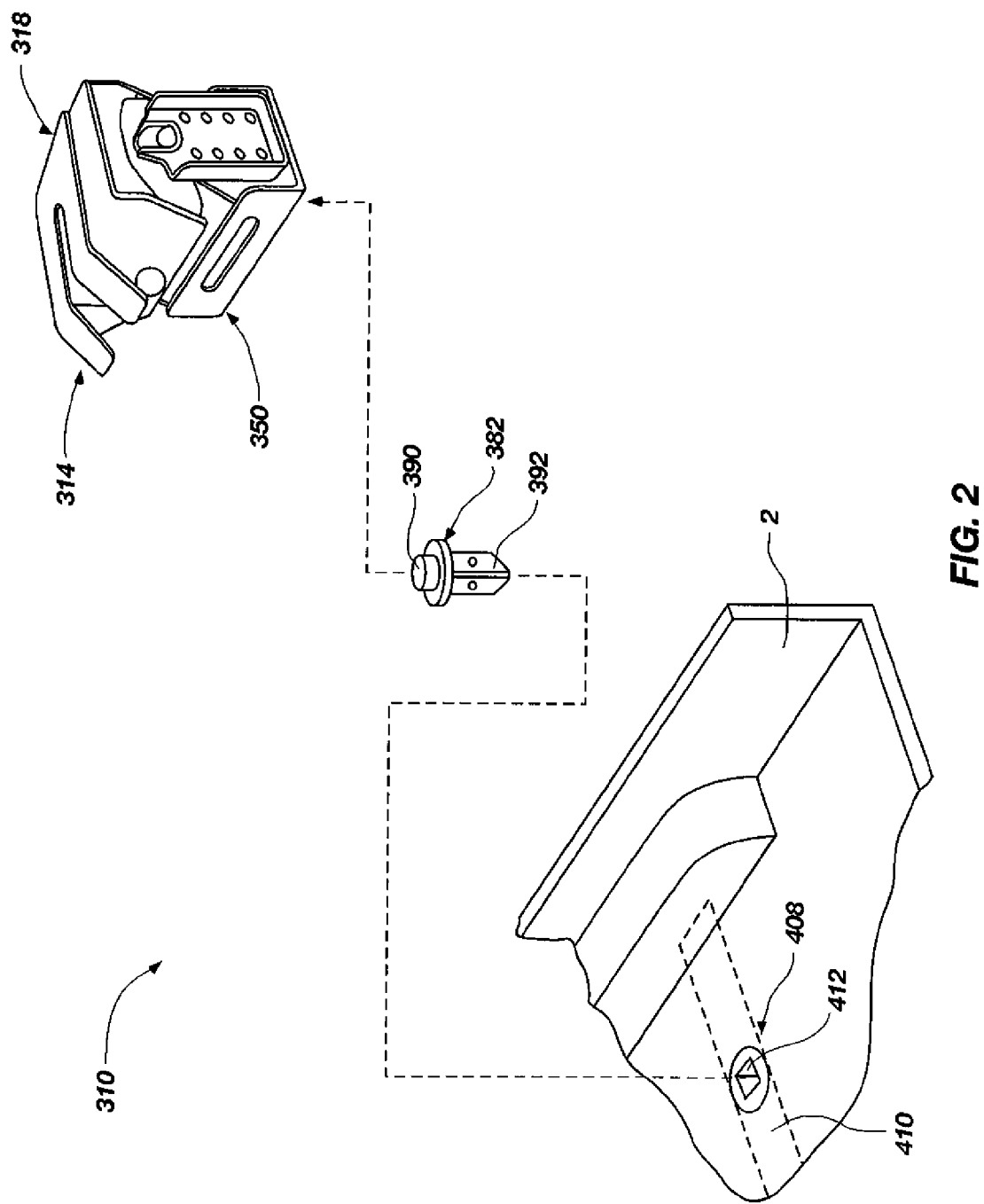
FIG. 2 illustrates an exploded perspective view of a more specific adaptive fifth-wheel hitch system in accordance with one exemplary embodiment of the present invention.

With reference to FIG. 2, illustrated is an exploded perspective view of an adaptive fifth-wheel hitch system in accordance with one exemplary embodiment of the present invention. As shown, the adaptive fifth-wheel hitch system 310 comprises a specific type of fifth-wheel hitch assembly 314 similar to those manufactured, sold and/or owned by Colibert Enterprises of Salt Lake City, Utah. The fifth-wheel hitch assembly 314 is shown as comprising a base component 350 and a head component 318. The head component 318 is configured to removably couple a fifth-wheel trailer (not shown), with the base component 350 being configured to support the head component 318 and to be mountable within the vehicle 2 via the vehicle hitch coupling system 408. It is noted that the receiving component of the vehicle hitch coupling system 408, as well as the coupling component of the adapter 382, are shown as being similar to those receiving components of the vehicle hitch coupling systems and corresponding coupling components of the hitch balls, respectively, as manufactured and sold by B&W Custom Truck Beds, Inc. of Humboldt, Kans. This is not intended to be limiting in any way. Indeed, it is contemplated that an adapter may be configured to match any type of hitch assembly with any type of vehicle hitch coupling system by configuring the adapter to comprise appropriate interfaces for these.

As the fifth-wheel hitch assembly 314 is of one type, and as the vehicle hitch coupling system 408 is of another or of a different type, rendering these otherwise incompatible or inoperable with one another, the adaptive fifth-will hitch system 310 is shown as comprising an adapter 382 that functions to enable the fifth-wheel hitch assembly 314 to be used with the vehicle hitch coupling system 408. The adapter 382 comprises a mounting component 390 having a specifically configured interface that corresponds to an interface of a structural arrangement of the fifth-will hitch assembly 314, and more particularly of the base component 350. The mounting component 390 effectively joins the adapter 382 to the base component 350 of the fifth-wheel hitch assembly 314.

The adapter 382 further comprises a coupling component 392 having a specifically configured interface that corresponds to an interface of a receiving component 412 supported by a vehicle mount 410 of the vehicle hitch coupling system 408. Once the adapter 382 is joined with the fifth-wheel hitch assembly 314, the entire adaptive fifth-wheel hitch system 310 can be lowered into the vehicle 2 and the adapter 382 caused to removably couple the vehicle hitch coupling system 408. More specifically, the coupling component 392 may be caused to engage and be inserted into the receiving component 412, wherein the coupling component 392 comprises the same geometric configuration and substantially the same size as that of the receiving component 412. Once inserted, the adapter 382, and therefore the fifth-wheel hitch assembly 314, may be secured in place in the vehicle 2 using the same means of the vehicle hitch coupling system 408 used to couple its regular or compatible fifth-wheel hitch assembly that doesn't require an adapter.

Figure 3:
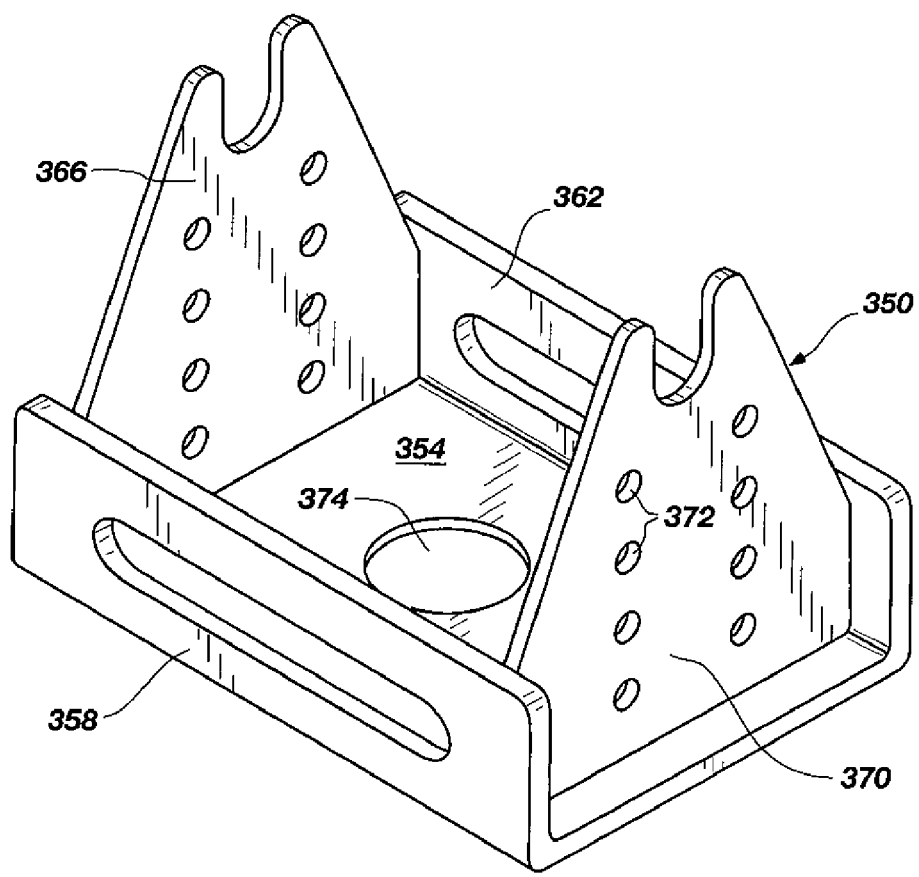
FIG. 3 illustrates a perspective view of the base component of the adaptive fifth-wheel hitch system of FIG. 2.
Figure 4:
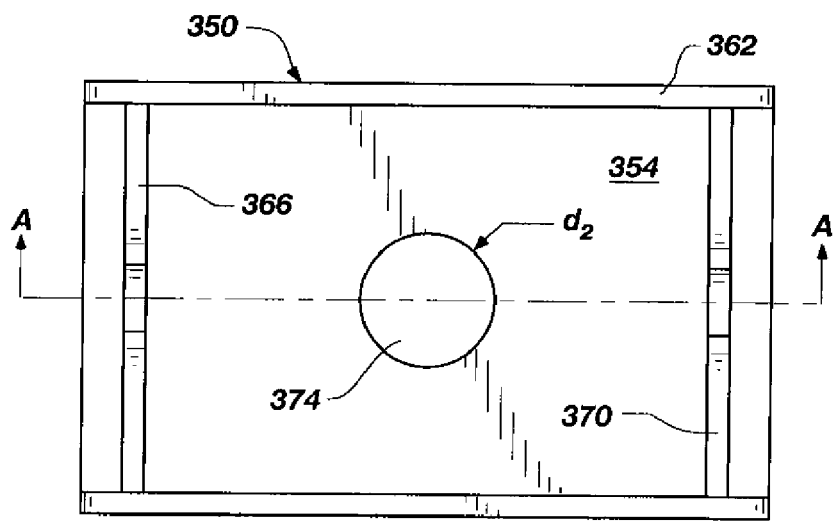
FIG. 4 illustrates a top view of the base component of FIG. 3.

FIGS. 3 and 4 illustrate the base component 350 of the fifth-wheel hitch assembly 314 shown in FIG. 2. Specifically, the base component 350 comprises a low profile design with a bottom plate 354 having opposing side members 358 and 362 extending upward therefrom. The base component 350 further comprises opposing end supports 366 and 370 that also extend upward from the bottom plate 354, and that each comprise u-shaped slots for receiving corresponding posts (not shown) of a head component (also not shown, but see FIG. 2) therein. The end supports 366 and 370 further comprise a series of apertures 372 formed therein for adjustably coupling respective support brackets (not shown, but see FIG. 2) having an inverted u-shaped receiver and coupling means operable therewith for pivotally supporting and coupling the posts of the head component. Adjusting the support brackets about the end supports 366 and 370 effectively functions to adjust the height of the head component relative to the base component 350.

The bottom plate 354 is shown as further comprising a central opening 374. The bottom plate 354 and the central opening 374 comprise the structural arrangement that provides or defines an interface for the coupling means used to secure the base component 350 and the entire fifth-wheel hitch assembly associated therewith to a known and compatible vehicle hitch coupling system. The bottom plate 354 and the central opening 374 are also preferably used to provide and define the interface usable by the present invention adapter to operably relate and secure the associated fifth-wheel hitch assembly to a different and otherwise incompatible vehicle hitch coupling system, such as described above. One skilled in the art will recognize, however, that other structural arrangements, and thus other interface configurations, are entirely possible and that those specifically described herein, and shown in the drawings, are not meant to be limiting in any way.

Figure 6:
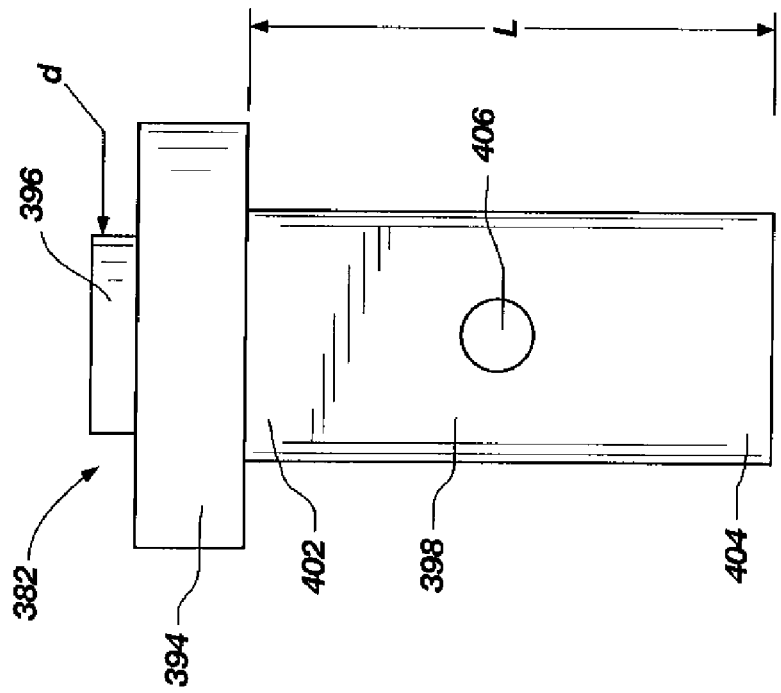
FIG. 6 illustrates a side view of the adapter of FIG. 5.
Figure 5:
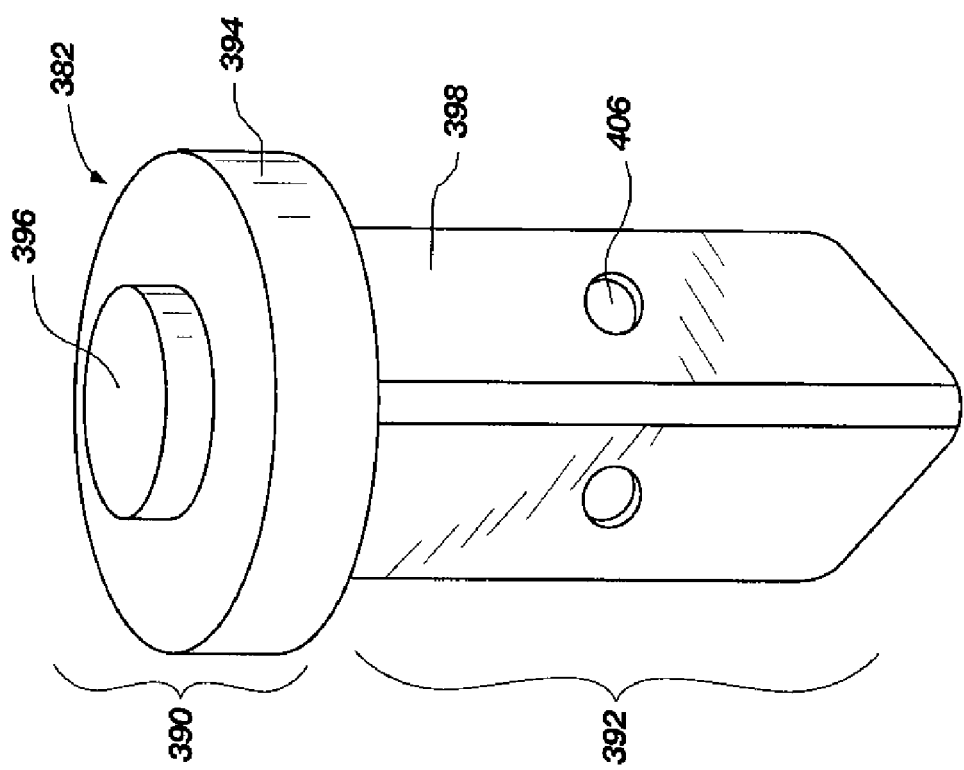
FIG. 5 illustrates a perspective view of the adapter as part of the adaptive fifth-wheel hitch system of FIG. 2.

With reference to FIGS. 5 and 6, illustrated are detailed perspective and front views, respectively, of the adapter 382 of FIGS. 2-4. The adapter 382 comprises a mounting component 390 having a base 394 situated about a first end 402 of the coupling component 392, and particularly the post 398. The base 394 is shown as comprising a cylindrical geometry, but obviously other geometries may be used. Extending upward from the base 394, in a direction opposite that of the post 398, is a plug 396, also having a cylindrical geometry. As with the structural arrangement of the base component 350, the mounting component 390 of the adapter 382 may also comprise other configurations that will be apparent to those skilled in the art. As such, the mounting components discussed herein and shown in the drawings are not meant to be limiting in any way.

Referring now to FIGS. 3-6, the mounting component 390 of the adapter 382 may be interfaced with the corresponding structural arrangement on the base component 350 in order to join the adapter 382 to the base component 350. As specifically shown, the plug 396, which comprises a diameter $d_1$ slightly less than the diameter $d_2$ of the central opening 374, may be inserted into the central opening 374 and the mounting component 390 advanced until the base 394 is properly seated against the underside surface of the base component 350. Once properly seated in this position, the adapter 382 may be secured to the base component 350 by welding the base 394 of the adapter 382 to the base component 350 of the fifth-wheel hitch assembly. As discussed, less permanent joining means or methods may be employed, such as providing matching threads along the outer edge or surface of the plug 396 and about the inner surface of the central opening 374, wherein the adapter 382 may be screwed into place and secured by a lock washer or other known means.

Referring back to FIGS. 5 and 6, the adapter 382 further comprises a coupling component 392 having a post 398 extending from the base 394 of the mounting component 390 in a direction opposite that of the plug 396. The post 398 comprises a substantially square cross-section and a length L that corresponds to a cross-section and a length of a receiving component of a vehicle hitch coupling system (not shown, but see FIG. 2). The post also may comprise one or more apertures formed therein, such as aperture 406 sized and configured to receive a locking pin of the vehicle hitch coupling system, thereby securing the adapter 382 and the fifth-wheel hitch assembly to the vehicle hitch coupling system, and in place within the vehicle. This is discussed in greater detail below. Again, the coupling component 392 may comprise many different configurations other than those described and shown herein, which will be apparent to those skilled in the art. The coupling component may comprise a configuration suitable to enable the adapter to be securely and removably coupled to any vehicle hitch coupling system.

Figure 7:
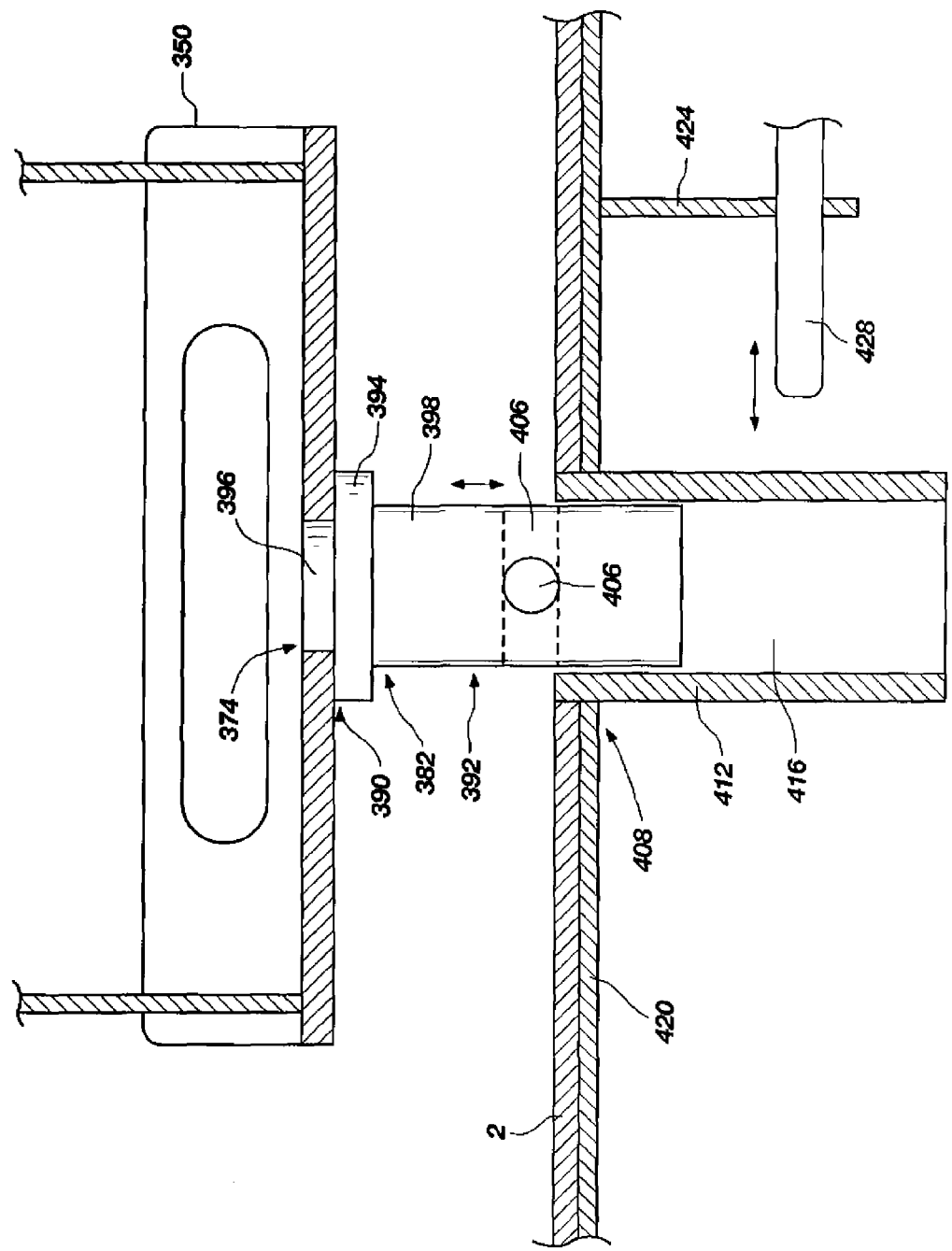
FIG. 7 illustrates a partial cross-sectional side view of the adaptive fifth wheel hitch system of FIG. 2, wherein the adapter is shown as operatively coupling a base component of a fifth wheel hitch assembly of one type to a vehicle hitch coupling system otherwise operable with a fifth-wheel hitch assembly of a different type.

With reference to FIG. 7, illustrated is a partial cross-sectional side view of the adaptive fifth-wheel hitch system of FIG. 2, wherein the adapter 382 is shown as operatively coupling the base component 350 of a fifth-wheel hitch assembly of one type to a vehicle hitch coupling system otherwise operable with a fifth-wheel hitch assembly of a different type. The base component 350 is shown in cross-section as being taken along lines A-A of FIG. 4. The mounting component 390 of the adapter 382 is securely joined with the base component 350, wherein the plug 396 is inserted into the central opening 374, such that the base 394 is properly seated about the underside of the base component 350. With the adapter 382 secured in this position, the base component 350 may be lowered into the vehicle 2 and the coupling component 392, and particularly the post 398 inserted into the opening 416 defined by the receiving component 412 of the vehicle hitch coupling system 408. The vehicle hitch coupling system may comprise a vehicle mounting assembly 420 that securely couples to the vehicle 2, such as via the frame or other structure(s), as known in the art, and that functions to support the receiving component 412, and ultimately the adaptive fifth-wheel hitch system.

Once inserted into the receiving component 412, the adapter 382 may be secured into place using the securing means of the existing vehicle hitch coupling system. As such, the adapter 382 further comprises a configuration and interface intended to utilize such existing securing means in a similar manner as the type of fifth-wheel hitch assembly that is typically and commonly operable with the vehicle hitch coupling system. As shown, the vehicle hitch securing system comprises a biased pin 428 supported by the mounting assembly 420, and particularly a support 424, which pin 428 is configured to be received within the aperture 406 formed in the post 398, and to extend through the post 398, upon the aperture 406 being properly aligned with the pin 428, as known in the art.

Figure 8:
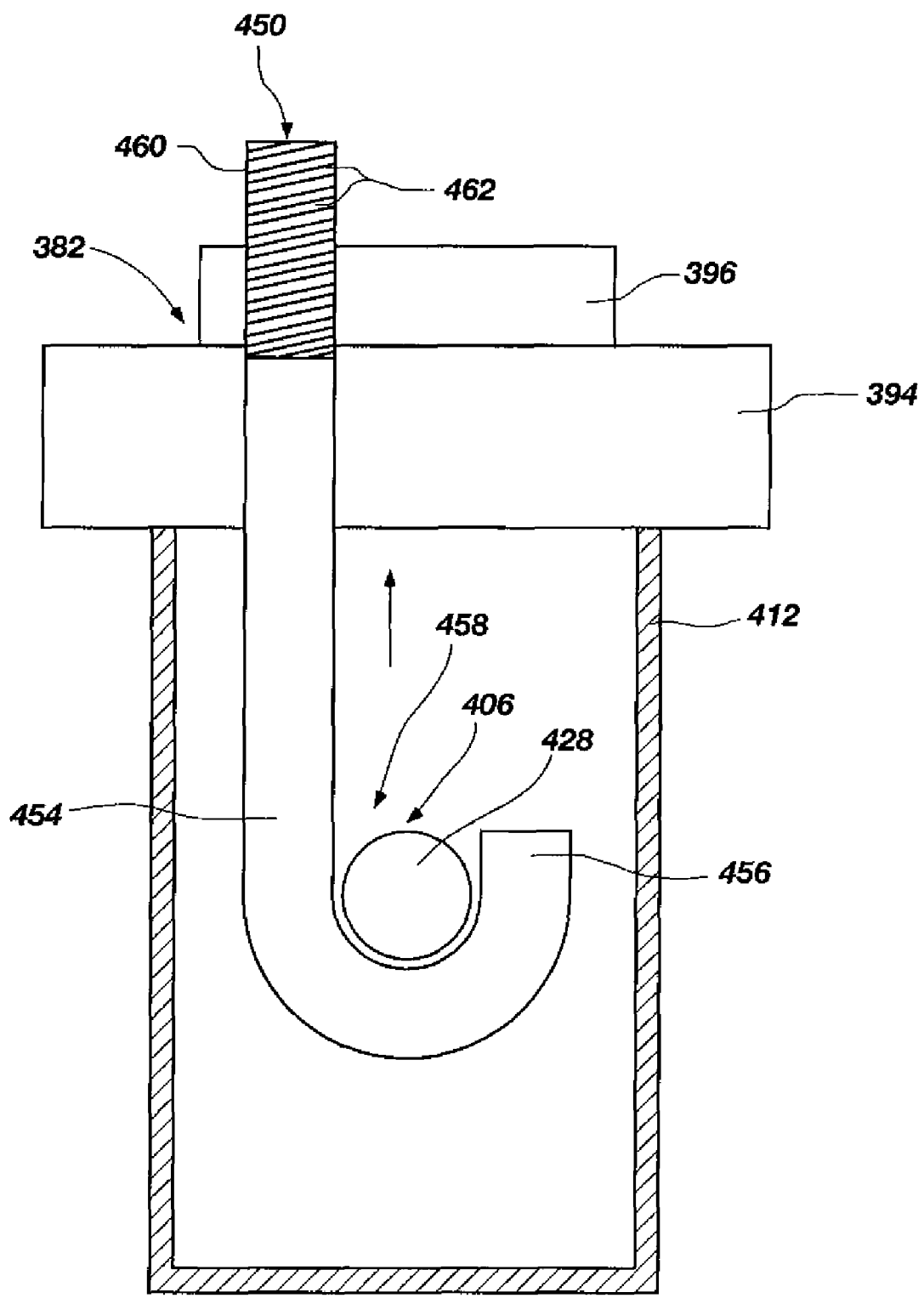
FIG. 8 illustrates a side view of an adapter and a j-bolt configured to enhance the coupling of an adapter and a vehicle hitch coupling system in accordance with one exemplary embodiment of the present invention.

The above-described securing of the adapter 382 within the receiving component 412 using the pin 428 may be further enhanced to reduce any play or slack between the adapter 382 and the vehicle hitch coupling system. As such, the present invention adaptive fifth-wheel hitch system further comprises means for enhancing the securing of the adapter. FIG. 8 illustrates a side view of an adapter 382 as secured within a receiving component 412, with pin 428 properly inserted through aperture 406. FIG. 8 further illustrates, as one exemplary means for enhancing, a j-bolt 450 operable to further secure the adapter 382 within the receiving component 412. The j-bolt 450 comprises a shaft 454 shaped to comprise an upturned end 456 forming a recess 458 sized and configured to receive the pin 428 therein. The shaft 454 further comprises a second end 460 having threads 462 formed therein for facilitating tightening of the j-bolt 450, which effectively functions to induce an upward force on the pin 428 and a downward force on the adapter 382, thus drawing the pin and the adapter 382 together. As the j-bolt 450 is tightened, the pin 428 is forced upward against the adapter 382, thus securing the connection between the pin 428 and the adapter 382 to remove any play or slack therein.

Figure 9:
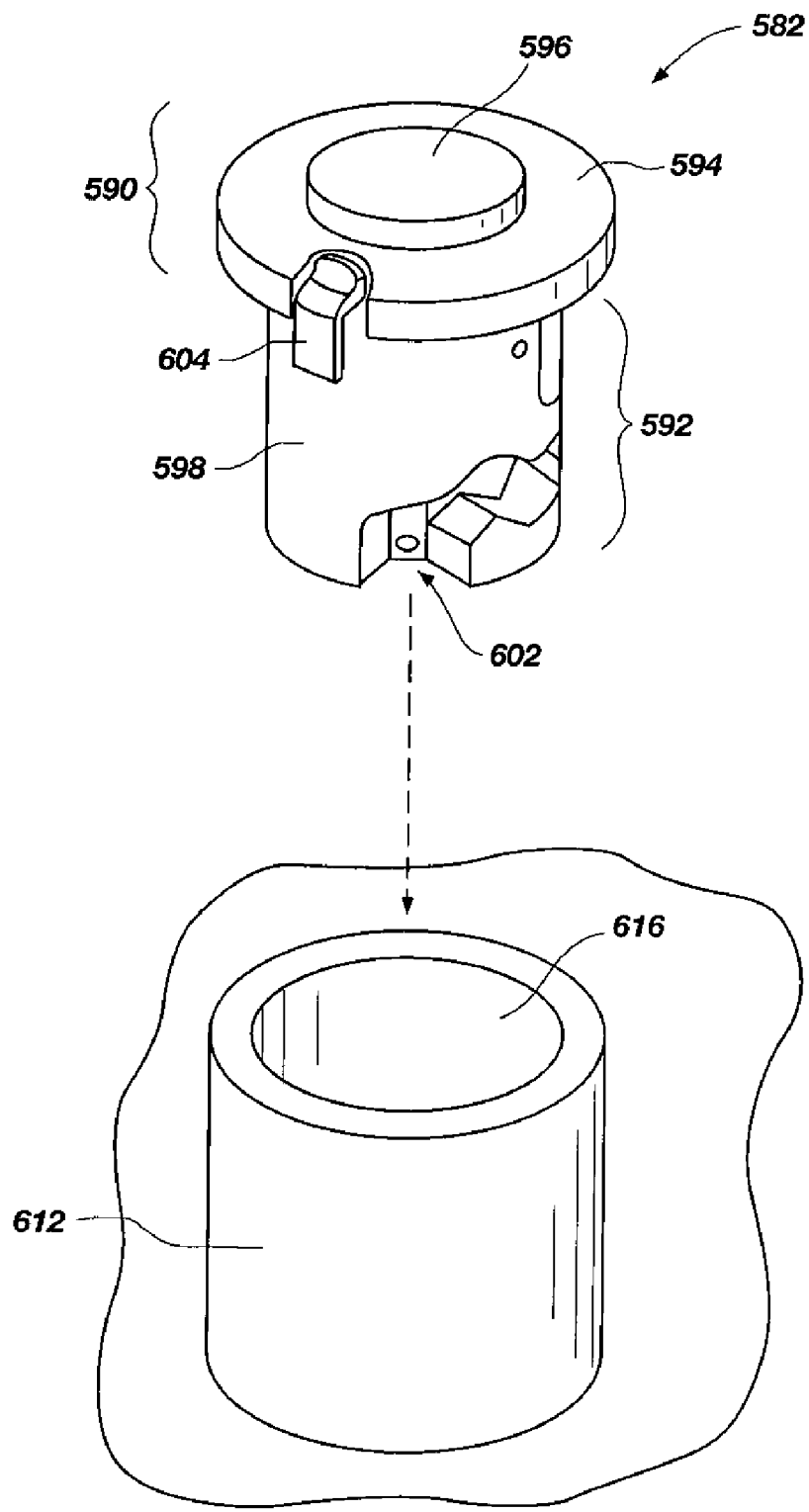
FIG. 9 illustrates a perspective view of an adapter operable within an adaptive fifth-wheel hitch system in accordance with another exemplary embodiment of the present invention.

With reference to FIG. 9, illustrated is an adapter for use within an adaptive fifth-wheel hitch system in accordance with another exemplary embodiment of the present invention. As shown, the adapter 582 comprises a mounting component 590 having a base 594 and a plug 596 similar to the adapter 382 discussed above with respect to FIGS. 2-8, and configured to interface with the fifth-wheel hitch assembly of FIG. 2. As such, the description provided above is incorporated herein, where applicable, with respect to this particular embodiment. The adapter 582 further comprises a coupling component 592 having a post 598. The post 598 comprises a recess 602 for receiving a securing member therein, which securing member is part of an existing vehicle hitch coupling system. The coupling component 592 further comprises a biased release 604 designed and configured to facilitate insertion and removal of the adapter 582 from the receiving component 612 of the vehicle hitch coupling system. Similar to the embodiment described above, the adapter 582 may be inserted into the recess 616 of the receiving component 612 for the purpose of securing the adapter 582, and therefore the adaptive fifth-wheel hitch system, to the vehicle hitch coupling system.

It is noted that the coupling component 592 of the adapter 582, as well as the receiving component 612, are similar to the coupling component of the Diamond Hitch™ and corresponding receiving component of the vehicle hitch coupling system manufactured and sold by Blue Ox® of Pender, Neb. Again, this type of vehicle hitch coupling system and corresponding hitch assembly is merely exemplary, and not intended to be limiting in any way.

Although not specifically described herein, t is noted that an adapter may be manufactured and produced to interface with other existing vehicle hitch coupling systems, such as the Drop N' Lock™ vehicle hitch coupling system manufactured and sold by Diers Ag & Trailer Sales, Inc. of Howard Lake, Minn. Those skilled in the art will recognize still others.

Figure 10:
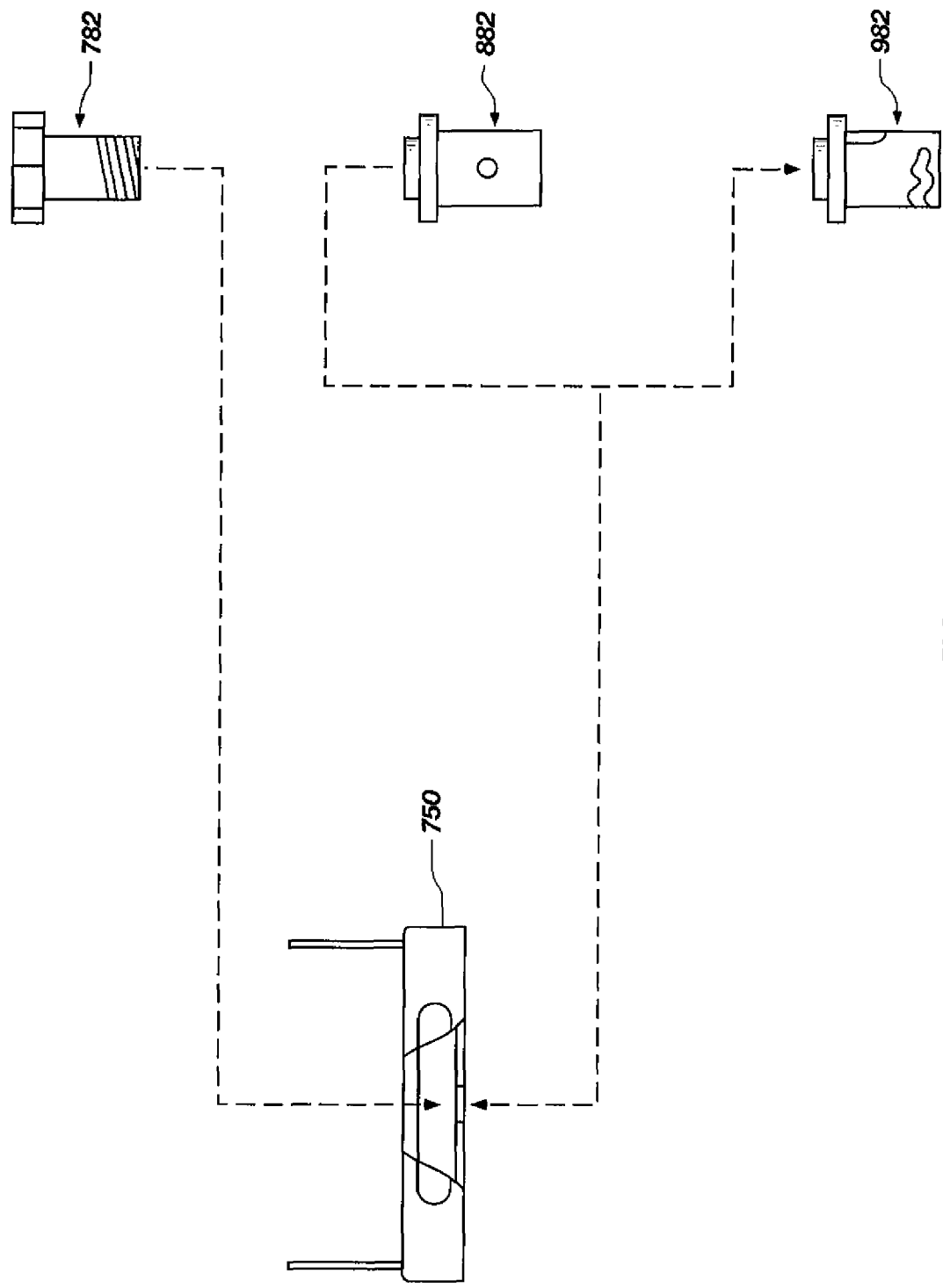
FIG. 10 illustrates how a base component of a fifth-wheel hitch assembly is intended to be operable with a plurality of adapters in order to operably couple the base component and an associated head of the fifth-wheel hitch assembly to different vehicle hitch coupling systems simply by using different adapters.

With reference to FIG. 10, illustrated is a base component 750 of a fifth-wheel hitch assembly, shown as being operable with several different adapters, namely adapters 782, 882 and 982, in order to enable the fifth-wheel hitch assembly to be used with multiple different types of vehicle hitch coupling systems. It will be obvious to one skilled in the art that other types of adapters may be utilized, other than those specifically shown herein. In addition, it will be obvious to one skilled in the art that the adapters may comprise different interfaces to enable them to be used with different fifth-wheel hitch assemblies.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. An adaptive fifth-wheel hitch system comprising:
    a vehicle hitch coupling system having a receiving component having an interface configuration;
    a fifth-wheel hitch assembly configured to removably couple a fifth-wheel trailer to a vehicle, said fifth-wheel hitch assembly having an interface configuration different from said interface configuration of said receiving component, said fifth-wheel hitch assembly being incapable of mating with, and directly coupling to, said vehicle hitch coupling system; and
    an adapter that removably couples said fifth-wheel hitch assembly and said vehicle hitch coupling system, said adapter comprising:
        a mounting component, having a first interface, coupled to said fifth-wheel hitch assembly;
        a coupling component, having a second interface, coupled to said vehicle hitch coupling system, said coupling component corresponding to said receiving component of said vehicle hitch coupling system; and
        a means for enhancing the coupling of said adapter within said receiving component; said enhancing means comprising a j-bolt coupled to said adapter to facilitate drawing together said coupling system and said adapter to reduce play therebetween.

2. The adaptive fifth-wheel hitch system of claim 1, wherein said fifth-wheel hitch assembly comprises:
    a head component that receives and removably couples said fifth-wheel trailer; and
    a base component that supports said head component.

3. The adaptive fifth-wheel hitch system of claim 2, wherein said adapter is coupled to said base component.

4. The adaptive fifth-wheel hitch system of claim 1, wherein said adapter is removably joined to said fifth-wheel hitch assembly.

5. The adaptive fifth-wheel hitch system of claim 1, wherein said adapter is permanently joined to said fifth-wheel hitch assembly.

6. The adaptive fifth-wheel hitch system of claim 1, wherein said coupling system comprises a pin, said j-bolt engaging said pin.

7. An adapter for coupling a fifth-wheel hitch assembly and a vehicle hitch coupling system, said vehicle hitch coupling system comprising a receiving component, said adapter comprising:

a first interface providing a mounting component coupled to said fifth-wheel hitch assembly;

a second interface having a coupling component coupled to said vehicle hitch coupling system, wherein said fifth-wheel hitch assembly comprises an interface configuration different from an interface configuration of said vehicle hitch coupling system, such that said fifth-wheel hitch assembly is incapable of mating with and directly coupling to said vehicle hitch coupling system without said adapter; and a means for enhancing the coupling of said adapter with said receiving component, said enhancing means comprising a j-bolt coupled to said adapter to facilitate drawing together said coupling system and said adapter to reduce play therebetween.

* * * * *